(12) United States Patent
Maes (10) Patent No.: US 8,090,848 B2
(45) Date of Patent: Jan. 3, 2012

(54) IN-VEHICLE MULTIMEDIA REAL-TIME COMMUNICATIONS

(75) Inventor: Stéphane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 81 days.

(21) Appl. No.: 12/544,459

(22) Filed: Aug. 20, 2009

(65) Prior Publication Data

US 2010/0049826 A1    Feb. 25, 2010

Related U.S. Application Data

(60) Provisional application No. 61/090,648, filed on Aug. 21, 2008.

(51) Int. Cl.
G06F 15/16 (2006.01)

(52) U.S. Cl. ........ 709/228; 709/207; 709/217; 709/223; 701/1

(58) Field of Classification Search .................. 709/207, 709/223, 227, 217, 228; 701/1
See application file for complete search history.

(56) References Cited

U.S. PATENT DOCUMENTS

| | | |
|---|---|---|
| 5,414,812 A | 5/1995 | Filip et al. |
| 5,699,513 A | 12/1997 | Feigen et al. |
| 5,786,770 A | 7/1998 | Thompson |
| 5,850,517 A | 12/1998 | Verkler et al. |
| 5,867,665 A | 2/1999 | Butman et al. |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |

(Continued)

FOREIGN PATENT DOCUMENTS

EP    2 034 748 A1    3/2009

OTHER PUBLICATIONS

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.

(Continued)

Primary Examiner — David Lazaro
(74) Attorney, Agent, or Firm — Kilpatrick Townsend & Stockton LLP (57) ABSTRACT

Embodiments of the invention provide systems and methods for providing an in-vehicle, multimedia, real-time communication system. According to one embodiment, a system for providing in-vehicle communication services can comprise a communications network and a vehicle user agent communicatively coupled with the first communications network, wherein the vehicle user agent publishes one or more published presence attributes. A Service Delivery Platform (SDP) can be communicatively coupled with the communications network. The SDP can provide a presence service adapted to receive the one or more published presence attributes from the vehicle user agent and update a presence profile for the vehicle user agent based on the received presence attributes. The presence attributes can comprise at least one attribute indicating information other than presence information and to provide one or more telco functions to the vehicle user agent.

27 Claims, 5 Drawing Sheets

U.S. PATENT DOCUMENTS

| | | |
|---|---|---|
| 6,466,984 B1 | 10/2002 | Naveh et al. |
| 6,496,864 B1 | 12/2002 | McCartney |
| 6,578,159 B1 | 6/2003 | Kitagawa et al. |
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,868,413 B1 | 3/2005 | Grindrod et al. |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 * | 5/2006 | Guedalia et al. ............ 709/220 |
| 7,111,060 B2 | 9/2006 | Araujo et al. |
| 7,114,146 B2 | 9/2006 | Zhang et al. |
| 7,114,148 B2 | 9/2006 | Irving et al. |
| 7,143,092 B1 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,334 B2 | 5/2007 | Casati et al. |
| 7,272,625 B1 | 9/2007 | Hannel et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,716,310 B2 | 5/2010 | Foti |
| 7,752,634 B1 | 7/2010 | Saxena et al. |
| 7,853,647 B2 | 12/2010 | Maes |
| 7,860,490 B2 | 12/2010 | Maes |
| 7,873,316 B2 | 1/2011 | Maes |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0154233 A1 | 8/2003 | Patterson |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0110493 A1 | 6/2004 | Alvarez et al. |
| 2004/0128546 A1 | 7/2004 | Blakley et al. |
| 2004/0139319 A1 | 7/2004 | Favazza et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0054287 A1 | 3/2005 | Kim |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0041669 A1 | 2/2006 | Bemmel et al. |
| 2006/0080117 A1 | 4/2006 | Carr et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0212574 A1 | 9/2006 | Maes |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0061397 A1 | 3/2007 | Gregorat et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0150480 A1 | 6/2007 | Hwang et al. |
| 2007/0150936 A1 | 6/2007 | Maes |
| 2007/0201376 A1 | 8/2007 | Marshall-Wilson |
| 2007/0203841 A1 | 8/2007 | Maes |
| 2007/0204017 A1 | 8/2007 | Maes |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0291859 A1 | 11/2007 | Maes |
| 2007/0280226 A1 | 12/2007 | Sonalkar et al. |
| 2008/0013533 A1 | 1/2008 | Bogineni et al. |
| 2008/0025243 A1 | 1/2008 | Corneille et al. |
| 2008/0080479 A1 | 4/2008 | Maes |
| 2008/0109853 A1 | 5/2008 | Einarsson et al. |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0186845 A1 | 8/2008 | Maes |
| 2008/0189401 A1 | 8/2008 | Maes |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0034426 A1 | 2/2009 | Luft et al. |
| 2009/0061404 A1 | 3/2009 | Atwal et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0193057 A1 | 7/2009 | Maes |
| 2009/0193433 A1 | 7/2009 | Maes |
| 2009/0201917 A1 | 8/2009 | Maes et al. |
| 2009/0228584 A1 | 9/2009 | Maes et al. |
| 2009/0306834 A1 * | 12/2009 | Hjelm et al. ............ 701/1 |
| 2009/0328051 A1 | 12/2009 | Maes |
| 2010/0049640 A1 | 2/2010 | Maes |
| 2010/0058436 A1 | 3/2010 | Maes |

| | | |
|---|---|---|
| 2010/0077082 A1 | 3/2010 | Hession et al. |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |

OTHER PUBLICATIONS

O'Doherty, Phelim, "JSLEE—SIP Servlet", <http://java.sun.com/products/jain/JSLEE-SIPServlet.pdf, 2003, 13 pages.

The Parlay Group, "Specifications", <http://web.archive.org/web/20050114014707/www.parlay.org/specs/index.asp>, Jan. 14, 2005, 2 pages.

Wikipedia, "Parlay", <http://web.archive.org/web/20050130172632/en.wikipedia.org/wiki/Parlay>, Jan. 30, 2005, 3 pages.

Wikipedia, "Object-Oriented Programming", <http://web.archive.org/web/20051211141918/http://en.wikipedia.org/wiki/Object-oriented_programming>, Dec. 11, 2005, 10 pages.

Wikipedia, "OSI model", <http://web.archive.org/web/20050907132012/http://en.wikipedia.org/wiki/Osi_model>, Sep. 7, 2005, 8 pages.

Burger, E. et al., "Deploying CCXML for Application-Layer Call Control," Aug. 2006, 11 pages.

Kim et al., "Implementation of Third Party Based Call Control using Parlay Network API in SIP Environment," ICOIN 2003, LNCS 2662, 2003, pp. 416-425.

Romellini, C. et al., "CCXML: The Power of Standardization," Loquendo, Sep. 27, 2005.

U.S. Appl. No. 11/024,160, filed Dec. 2004, Maes.

Andrews, Tony et al, Business Process Execution Language for Web Services, Version 1.1, BEA Systems, International Business Machines Corporation, SAP AG, Siebel Systems, May 5, 2003, 31 pages.

Liberty Architecture Overview, Liberty Alliance Project Version 1.1, Piscataway New Jersey, Jan. 15, 2003, 44 pages.

Maes, Stephanie, Multi-modal Web IBM Position W3C/WAP Workshop, IBM Research Human Language Technologies, downloaded http://www.w3.org on May 26, 2003, 9 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Simpson et al, Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm on May 26, 2003, 5 Pages.

Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Thomas Manes, Anne, "Registering a Web Service in UDDI", 2003.

International Search Report and Written Opinion of PCT/US2010/037074 mailed Jun. 1, 2011, 16 pages.

U.S. Appl. No. 11/848,347, filed Aug. 31, 2007, Advisory Action mailed May 23, 2011, 3 pages.

U.S. Appl. No. 11/926,738, filed Oct. 29, 2007, Advisory Action mailed May 25, 2011, 3 pages.

U.S. Appl. No. 11/943,101, filed Nov. 20, 2007, Advisory Action mailed Apr. 28, 2011, 3 pages.

U.S. Appl. No. 11/951,500, filed Dec. 6, 2007, Final Office Action mailed Apr. 14, 2011, 33 pages.

U.S. Appl. No. 11/024,160, filed Dec. 27, 2004, Final Office Action dated Jun. 1, 2011, 11 pages.

U.S. Appl. No. 12/019,335, filed Jan. 24, 2008, Office Action mailed May 23, 2011, 18 pages.

U.S. Appl. No. 12/544,484, filed Aug. 20, 2009, Office Action dated Jun. 3, 2011, 6 pages.

U.S. Appl. No. 11/969,343, filed Jan. 4, 2008, Office Action mailed Jun. 10, 2011, 13 pages.

U.S. Appl. No. 11/848,347, filed Aug. 31, 2007, Final Office Action mailed Mar. 7, 2011, 21 pages.

U.S. Appl. No. 11/926,738, filed Oct. 29, 2007, Final Office Action mailed Mar. 17, 2011, 13 pages.

U.S. Appl. No. 11/943,101, filed Nov. 20, 2007, Final Office Action mailed Feb. 14, 2011, 11 pages.

U.S. Appl. No. 10/855,999, filed May 28, 2004, Advisory Action dated Mar. 16, 2011, 3 pages.

U.S. Appl. No. 11/024,160, filed Dec. 27, 2004, Office Action dated Feb. 7, 2011, 11 pages.

U.S. Appl. No. 11/939,705, filed Nov. 14, 2007, Final Office Action mailed Mar. 17, 2011, 21 pages.

* cited by examiner

IN-VEHICLE MULTIMEDIA REAL-TIME COMMUNICATIONS

CROSS-REFERENCES TO RELATED APPLICATIONS

This application claims the benefit of U.S. Provisional Application No. 61/090,648, filed Aug. 21, 2008 by Maes and entitled "In-Vehicle Multimedia Real-Time Communications," of which the entire disclosure is incorporated herein by reference for all purposes.

This application is also related to the following commonly-owned, co-pending applications (the "Related Applications"), of which the entire disclosure of each is incorporated herein by reference for all purposes:

U.S. patent application Ser. No. 12/364,642, filed Feb. 3, 2009 by Maes and entitled "Pragmatic Approaches to IMS"; U.S. patent application Ser. No. 11/357,653, filed Feb. 16, 2006, by Maes and entitled "Factorization of Concerns to Build a SDP (Service Delivery Platform)"; U.S. patent application Ser. No. 11/949,930, filed Dec. 4, 2007 by Maes and entitled "Call Control Enabler Abstracted From Underlying network Technologies"; U.S. patent application Ser. No. 12/014,387, filed Jan. 15, 2008 by Maes and entitled "Using Location as Presence Attribute"; U.S. patent application Ser. No. 11/877,129, filed Oct. 23, 2007 by Maes and entitled "Network Agnostic Media Control Enabler"; U.S. patent application Ser. No. 12/045,220, filed Mar. 10, 2008 by Maes and entitled "Presence-Based Event-Driven Architecture"; U.S. patent application Ser. No. 12/949,287, filed Nov. 18, 2010 by Maes and entitled "In-Session Continuation of a Streaming Media Session"; U.S. patent application Ser. No. 12/544,471, filed Aug. 20, 2009 by Maes and entitled "Service Level Network Quality of Service Policy Enforcement"; and U.S. patent application Ser. No. 12/544,484, filed Aug. 20, 2009 by Maes and entitled "Charging Enabler."

BACKGROUND OF THE INVENTION

Embodiments of the present invention relate generally to methods and systems for Intelligent Transportation Systems (ITS) communication systems and more particularly to providing in-vehicle, multimedia, real-time communications.

Today most in-vehicle navigation systems use proprietary telematics and conventional voice communications. Browsing and internet/IP communications are limited to web browsing when not moving. To reduce cost of communications, to offer better services and to automate assistance, the use of RTC (Real Time Communications) in vehicle is desirable. In the case of Intelligent Transportation Systems (ITS) service providers additional questions can be raised: how to best provide the IP-based RTC services considering time to market and overall cost. So far dedicated networks and solutions have often been involved to provide services like remote monitoring and management, navigation support, in car communications and emergency systems. As IP based networks and services become available it is of interest to explore their adequacy and recommended approaches to develop IP-Based multimedia services in vehicle. Hence, there is a need for improved methods and systems for providing an in-vehicle, multimedia, real-time communication system.

BRIEF SUMMARY OF THE INVENTION

Embodiments of the invention provide systems and methods for providing an in-vehicle, multimedia, real-time communication system. According to one embodiment, a system for providing in-vehicle communication services can comprise a communications network and a vehicle user agent communicatively coupled with the first communications network, wherein the vehicle user agent publishes one or more published presence attributes. A Service Delivery Platform (SDP) can be communicatively coupled with the communications network. The SDP can provide a presence service adapted to receive the one or more published presence attributes from the vehicle user agent and update a presence profile for the vehicle user agent based on the received presence attributes. The presence attributes can comprise at least one attribute indicating information other than presence information and to provide one or more telco functions to the vehicle user agent. For example, the one or more published presence attributes can comprise at least one attribute indicating a vehicle location and/or at least one attribute indicating vehicle telemetrics. The one or more telco functions can comprise, for example, a charging function, a Quality of Service (QoS) management and enforcement function, and/or a presence service.

In some cases, the SDP can be further adapted to provide one or more services with features as provided by IP Multimedia Subsystem (IMS). For example, the one or more services can comprise a streaming media service, an IP television service, a multimedia messaging service, an instant messaging service, a telephony service, a presence service, a push-to-talk service, a conference service, e.g., a voice conference service or a multimedia conference service, a download service, an upload service, etc.

In some cases, the SDP can be further adapted to maintain a communication session with the vehicle user agent upon a failure of the session on the communication network. For example, the SDP can further comprise a media server. In such a case, maintaining the communication session can comprise maintaining a state of the communication session with the media server. Maintain the communication session can comprise resuming the communication session with the vehicle user agent on the communication network or on a second communication network.

According to another embodiment, a method for providing in-vehicle communication services can comprise publishing one or more presence attributes with a vehicle user agent to a presence service. The one or more published presence attributes can be received from the vehicle user agent at the presence service. A presence profile for the vehicle user agent can be updated with the presence service based on the received presence attributes. The presence attributes can comprise at least one attribute indicating information other than presence information and to provide one or more telco functions to the vehicle user agent. For example, the one or more published presence attributes can comprise one or more of an attribute indicating a vehicle location and an attribute indicating vehicle telemetrics. The one or more telco functions can be selected from a group consisting of: a charging function; a Quality of Service (QoS) management and enforcement function; and a presence service.

In some cases, the presence service can be provided by a Service Delivery Platform (SDP). In such cases, the SDP can provide one or more services with features as provided by IP Multimedia Subsystem (IMS). For example, the one or more services can be selected from a group consisting of: a streaming media service; an IP television service; a multimedia messaging service; an instant messaging service; a telephony service; a presence service; a push-to-talk service; a conference service; a voice conference service; a download service; and an upload service.

According to yet another embodiment, a machine-readable medium can have stored thereon a series of executable instructions which, when executed by a processor, cause the processor to provide in-vehicle communication services by receiving one or more published presence attributes from a vehicle user agent at a presence service of a Service Delivery Platform (SDP). The one or more published presence attributes can comprise one or more of an attribute indicating a vehicle location and an attribute indicating vehicle telemetrics. A presence profile for the vehicle user agent can be updated with the presence service based on the received presence attributes. The presence attributes can comprise at least one attribute indicating information other than presence information and to provide one or more telco functions to the vehicle user agent. The one or more telco functions can be selected from a group consisting of: a charging function; a Quality of Service (QoS) management and enforcement function; and a presence service. One or more services with features as provided by IP Multimedia Subsystem (IMS) can also be provided by the SDP. The one or more services can be selected from a group consisting of: a streaming media service; an IP television service; a multimedia messaging service; an instant messaging service; a telephony service; a presence service; a push-to-talk service; a conference service; a voice conference service; a download service; and an upload service.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing an in-vehicle, multimedia, real-time communication system. According to one embodiment, an in-vehicle multimedia real-time communication system can be implemented using the methods and systems described in the Related Application entitled Pragmatic Approaches to IMS. For example, a SIP/SIMPLE embodiment of a presence/VoIP Real Time communication solution in-vehicle can be implemented based on the methods and systems described in the Related Applications. Additionally, roaming and continuity of service can be addressed with an approach consistent with the pragmatic IMS approach disclosed in the Related Application entitled "Pragmatic Approaches to IMS." This can include using a media server using call control enabler and media server control enabler to provide continuity (hold the call) when switching networks or when coverage drops. Also noted is the use of presence as described in the Related Application entitled "Presence-Based Event-Driven Architecture" for telematics. Additionally or alternatively, the methods and systems of the Related Application entitled "Using Location as Presence Attributes" can be used to implement any of a number of location or services. Various additional details of embodiments of the present invention will be described below with reference to the figures.

Figure 1:
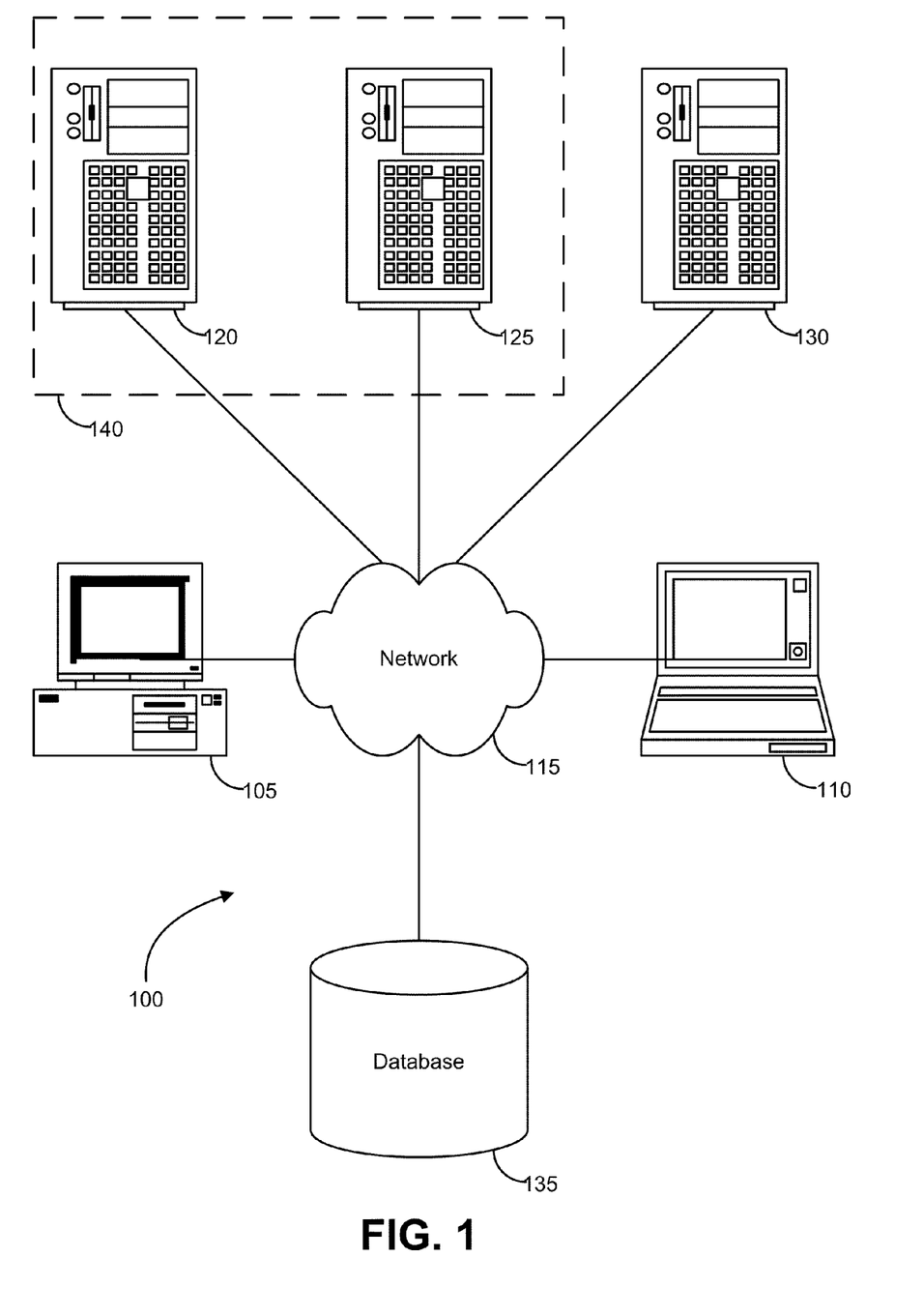
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
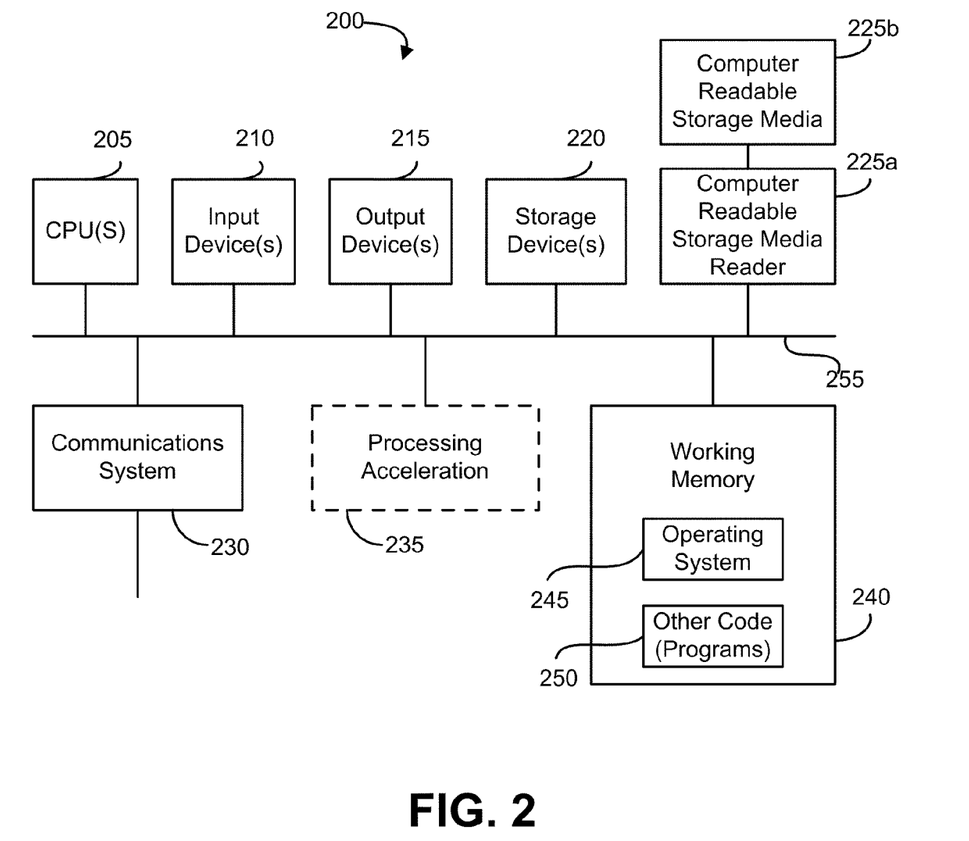
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the invention provide systems and methods for providing a Service Delivery Platform (SDP) based in-vehicle, multimedia, real-time communication system. According to one embodiment, an in-vehicle multimedia real-time communication system can be implemented based on the methods and systems described in the Related Application entitled Pragmatic Approaches to IMS. For example, a SIP/SIMPLE embodiment of a presence/VoIP Real Time communication solution in-vehicle can be implemented based on the methods and systems described in the Related Applications. Additionally, roaming and continuity of service can be addressed with an approach consistent with the pragmatic IMS approach disclosed in the Related Application entitled "Pragmatic Approaches to IMS." This can include using a media server using call control enabler and media server control enabler to provide continuity (hold the call) when switching networks or when coverage drops. Also noted is the use of presence as described in the Related Application entitled "Presence-Based Event-Driven Architecture" for telematics. Additionally or alternatively, the methods and systems of the Related Application entitled "Using Location as Presence Attributes" can be used to implement any of a number of location or services. According to one embodiment, a Real Time Communication (RTC) RTC system for example including a communicator as multimedia instant messaging with video and VoIP, can be integrated with a set of on board sensors and collecting and monitoring systems. The data collected can then be uploaded to the SDP. According to one embodiment, the SDP can be implemented according to the methods and systems described in the Related Application entitled "Pragmatic Approaches to IMS" a portion of which is reproduced here for the sake of convenience.

Figure 3:
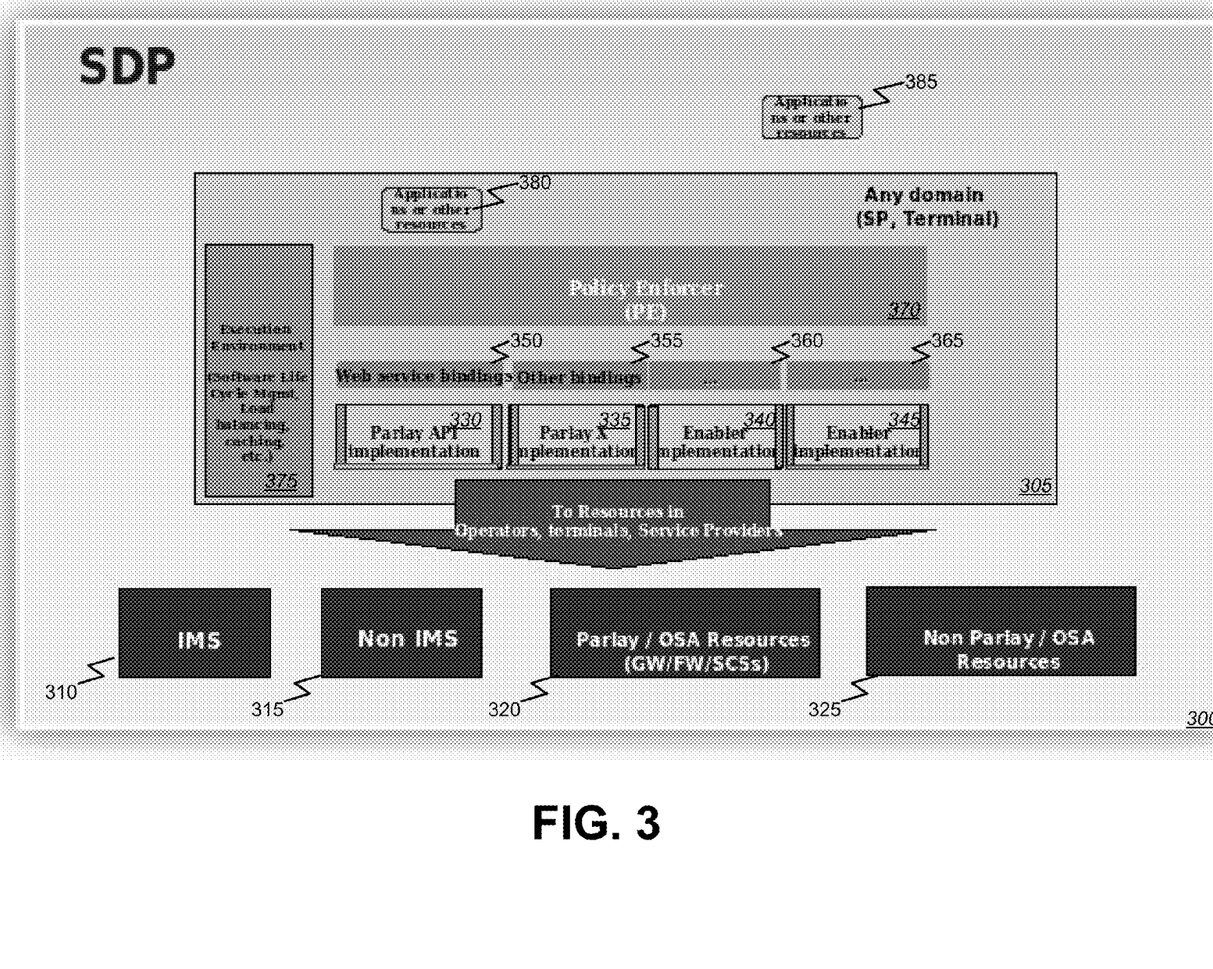
FIG. 3 is a block diagram illustrating an exemplary service delivery platform upon which embodiments of the present invention may be implemented.

FIG. 3 is a block diagram illustrating an exemplary service delivery platform upon which embodiments of the present invention may be implemented. In this example, the SDP 305 comprises a number of services 310 and 315 such as IMS network with resources and capabilities 310 and non-IMS network with resources and capabilities (e.g. an IP network with telco functions as described above) 315 as well as a number of other network resources 320 and 325 such as Parlay resources 320 and non-Parlay resources 325.

The SDP 305 can include a number of enablers 330-345 including but not limited to a Parlay API implementation 330, a Parlay X implementation 335 and/or other enablers 340 and 345. The various enablers 330-345 are defined to provide reusable, composable components with specific functions and can be adapted to provide an abstract interface to network resources 320 and 325, 310 and 315. According to one embodiment, the Parlay API implementation 330 and Parlay X implementation 335 (and any other enablers) can be implemented with southbound adapters to SIP or other protocols e.g. via JCA 1.5 or other protocols. When they consist of Parlay, they can be provided by an OSA application server The SDP 305 can also include one or more bindings 350-365 adapted to provide standard northbound interfaces for the one or more enablers 330-365. According to one embodiment, the enablers and interfaces can be implemented according to the methods and systems described in U.S. patent application Ser. No. 11/951,500 filed Dec. 6, 2007 by Maes and entitled "Achieving Low Latencies on Network Events in a Non-Real Time Platform" of which the entire disclosure is incorporated herein by reference for all purposes.

Such a horizontal platform can be standards-based and follow the SDP blueprint described in the Related Application entitled "Factorization of Concerns to Build a SDP (Service Deliver Platform) referenced above. Accordingly, applications 380 and 385 can be based on the SOA composition of reusable piece of codes (i.e. enablers 330-365) that expose relevant and intrinsic communications functionalities along with other reusable services which may not be standard or expose intrinsic functions. Intrinsic means that one type of functions relevant to the nature of the enabler is exposed and other aspects that are driven by business rules need not included. So for example, a messaging enabler need not include authentication, authorization, charging etc. These functions can be left to other enablers composed by the application 380 or 385 to add these features based on the business rules (aka policies). Enablers 330-365 when implemented by driving network resources or OSS/BSS resources can do that through an adapter approach. The same enabler 330-365 can use different adapters to be realized/implemented on different network technologies or using equipment from different vendors (when non standard). Doing this, the same enablers 330-365 can be deployed or even coexist on multiple network technologies like legacy networks (e.g. PSTN, IN, . . . with our without Parlay/OSA GWs), against other network resources (e.g. messaging GWs), on internet and on IMS and variations (e.g., pre-IMS, different release or IMS variations across standard bodies, future IMS etc.).

The SDP 305 can also include one or more policy enforcers 370. The policy enforcer 370 can be adapted to apply one or more policies to messages to or from the one or more enablers 330-345. A policy can be defined as any combination of a condition and one or more associated actions. Therefore, policies can be enforced to implement and/or enforce a service oriented architecture, factor out business rules, and define interactions between applications 380 and 385. Policies can be implemented and/or enforced by the policy enforcers 370 of the SDP 305, for example, according to the methods and systems described in one or more of the following applications: U.S. patent application Ser. No. 11/024,160 filed Dec. 27, 2004 by Maes and entitled "Policies as Workflows;" U.S. patent application Ser. No. 10/855,999 filed May 28, 2004 by Maes and entitled "Method and Apparatus for Supporting Service Enablers via Service Request Handholding;" U.S. patent application Ser. No. 10/856,588 filed May 28, 2004 by Maes and entitled "Method and Apparatus for Supporting Service Enablers via Service Request Composition;" and U.S. patent application Ser. No. 11/565,578 filed Nov. 30, 2006 by Maes and entitled "Orchestration of Policy Engines and Format Technologies" of which the entire disclosure of each is incorporated herein by reference for all purposes.

As noted, enablers 330-365 can expose northbound interfaces for their composition and use by other enablers, resources or applications 380 or 385. Standard interfaces can lead to Java and web services bindings 350 and other technologies like C, C+, etc. Enablers 330-365 can be composed via SOA. The policy enforcer 370 can be a SOA composition/ orchestration engine. As such, it applies the business rules when the enablers 330-365 are used by applications 380 and 385 when trying to use an enabler message and responses can be intercepted by the policy enforcer 370 that enforces the policies by composing calls to other enablers and resources as specified by the policies. This can be generalized to any composition. Applications 380 and 385 can compose enablers 330-365 to take advantage of communications features. There are no differences between local and remote, trusted or un-trusted applications. They only differ by the fact that different policies/business rules apply. Of course, it is possible that local applications rely on different bindings than remote applications. Enablers that are contemplated and considered to be within the scope of the present invention include but are not limited to a call control enabler as described in U.S. patent application Ser. No. 11/949,930 filed Dec. 4, 2007 by Maes and entitled "Call Control Enabler Abstracted from Underlying Network Technologies", a media server control enabler as described in U.S. patent application Ser. No. 11/877,129 filed Oct. 23, 2007 by Maes and entitled "Network Agnostic Media Server Control Enabler", an intelligent messaging enabler as described in U.S. patent application Ser. No. 11/939,705 filed Nov. 14, 2007 by Maes and entitled "Intelligent Message Processing", a charging enabler as described in U.S. patent application Ser. No. 12/544,484 filed Aug. 20, 2009 by Maes and entitled "Charging Enabler" of which the entire disclosure of each is incorporated herein by reference for all purposes. As described in the referenced applications and herein, these enablers can operate on different networks with possibly different underlying technologies while abstracting that technologies to the applications utilizing the functions provided by those enablers.

The set of enablers 330-365 can expose both network and application specific common, reusable intrinsic functions. Furthermore, the framework for specifying enablers 330-365 should be extensible so that additional enablers can be developed as needed. Enablers 330-365 can be reusable components that expose a useful set of network or application specific capability through northbound, standardized APIs. In the case of a J2EE realization of the SDP 305, such APIs can be exposed through either Java APIs, Web Services 350, or other bindings (e.g. SOAP, REST, etc.) 355-365. Enablers 330-365 can be realized via southbound adapters on the underlying network resources/network technologies. In particular they can be intended to be realizable on vanilla SIP networks (e.g., IETF), IMS, PSTN, IN or any other network technology as appropriate. South bound interfaces to implement the enablers 330-365 on any underlying network or resources can rely on JCA 1.5 with a design for high throughput and predictable low latencies, e.g. Parlay Corba adapters to Parlay GW/SCSs, Diameter, Connectors to legacy/proprietary resources like messaging GWs, Billing systems (e.g. Oracle BRM); SIP; HTTP as well as towards OSS and BSS. Other technologies can include but are not limited to RA, RMI, etc.

Enablers 330-365 can provide functions they're designed to provide (e.g., user location or call control) and should explicitly not provide that are set up by an operator's policies (e.g., security, authentication, authorization, SLA/QoS, Charging). Execution and enforcement of such policies are appropriately handled by the SOA layer (detailed in the Related Applications). Parlay API implementations 330 (e.g. Java realizations) and Parlay X API implementations 335 (i.e. web services bindings) can include, for example, call control, messaging/notification, charging, location, terminal status, and user interaction.

Generally speaking, the SDP 305 provides an architecture framework that describes the interaction with and among enablers 330-345, services 310 and 315 and resources 320 and 325. According to one embodiment, the SDP 305 can be implemented as a Service Orchestration Architecture (SOA). For example, the blueprint described in the Related Application entitled "Factorization of Concerns to Build a SDP (Service Delivery Platform)" referenced above and derived from the SDP 305 ensures that enablers 330-345 correctly abstract the network technologies. As a result, an application 380 or 385 is not affected by the coexistence or migration across network technologies as long that the network can bear the same capabilities.

As noted in the Related Applications, IMS can be considered to be Internet (IP Network) plus a set of useful features for consumers 695 and 696 or Communications Service Providers. These functions can include, for example, Charging, Security (Access control, Authentication, Firewall, etc.), Subscription Management, Policy enforcement, QoS, Logging, Support for specific Telco Services (e.g. Voice). The functions that matter may vary based on what the service provider wants to achieve and what are the dependencies on the network of the applications that the service provider wants to provide. The Internet or other IP network plus these Telco functions allows development of multimedia services as on the IMS. Indeed and as a particular and preferred embodiment, a SDP implemented according to the embodiments described above can provide the same services that can be developed and deployed on any network providing the required capabilities. This is the case of the IMS, Internet plus Telco functions or on legacy networks (PSTN, etc.).

Additionally or alternatively, services like presence, IM, VoIP, PBX, IPTV, video chat, multimedia real-time communications, conferencing, etc. can be implemented by various custom and/or standard enablers of the SDP. As described in the Related Applications, these enablers can operate on different networks with possibly different underlying technologies while abstracting that technologies to the applications utilizing the functions provided by those enablers. Therefore, a service platform like SDP can be used to develop/deploy services across different networks. Furthermore, these services can include in-vehicle communication services. These services can include multimedia and real-time communications over one or more networks. Therefore, roaming and continuity of service can be addressed with an approach consistent with the pragmatic IMS approach disclosed in the Related Application entitled "Pragmatic Approaches to IMS." This can include using a media server using call control enabler and media server control enabler to provide continuity (hold the call) when switching networks or when coverage drops. Also noted is the use of presence information as described in the Related Application entitled "Presence-Based Event-Driven Architecture" for telematics. Additionally or alternatively, the methods and systems of the Related Application entitled "Using Location as Presence Attributes" can be used to implement any of a number of location or services.

Figure 4:
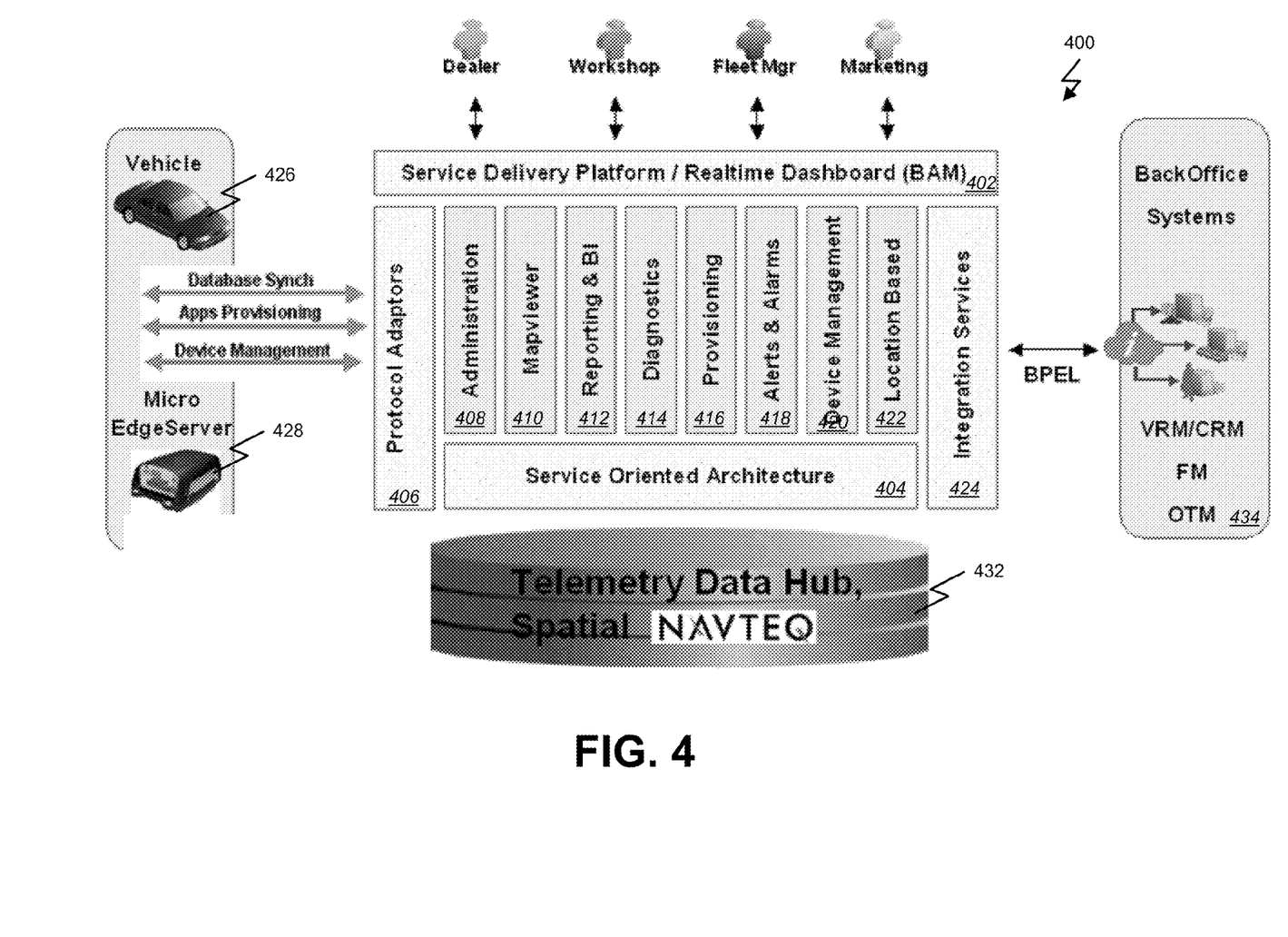
FIG. 4 is a block diagram illustrating a view of an exemplary system upon which embodiments of the present invention may be implemented.

FIG. 4 is a block diagram illustrating another view of an exemplary system upon which embodiments of the present invention may be implemented. In this example, the system 400 includes an SDP 402 as described above. The SDP can be communicatively coupled with a vehicle 426 via one or more protocol adaptors 406 and a wireless communication network (not shown here). The wireless network may include one or more micro edge servers 428 as known in the art. The SDP 402 can be implemented as a Service Orchestration Architecture (SOA) 404 and may include any number of applications and/or services 408-422 including but not limited to administration services 406, a map viewer service 410, a reporting service 412, a diagnostic service 414, a provisioning service 416, a alert and alarm service 418, a device management service 420 and various location based services 422. The SDP 402 can also provide one or more integration services 424 for interfacing the other services 408-422 of the SDP 402 with on or more back office systems 434 providing various management functions such as Vendor Relationship Management (VRM), Customer Relationship Management (CRM), etc.

According to one embodiment, telemetry data can be collected from the vehicle 426 and stored by the SDP 402 and/or services 408-422 of the SDP in a repository 432. The services 408-422 of the SDP 402 can then be provided based on and/or using the telemetry data and possibly other information such as provided by or directed by the back office systems 434. According to one embodiment and as noted above, collection of such telemetry data or "telematics" from the vehicle can be performed according to the methods and systems described in the Related Applications entitled "Presence-Based Event-Driven Architecture" and "Using Location as Presence Attributes." In other words, telematic data for the vehicle 426 can be provided to the SDP 402 as presence information collected and published, for example, by a user agent (not shown here) in or for the vehicle 426.

As noted in the Related Application entitled "Presence-Based Event-Driven Architecture," a presence-based network can be used for monitoring of systems, devices, or agents, e.g., the vehicle 426 and/or an agent associated with the vehicle 426. More specifically, a presence network can be used to implement systems such as an Event Driven Architecture (EDA) by extending a presence profile to include attributes indicating information other than or in addition to presence information, e.g., telematics for the vehicle 426. As described in "Presence-Based Event-Driven Architecture," presence attributes can be used to identify or indicate any type of information related to the principal, i.e., the vehicle or user agent associated with the vehicle. For example, such information can include but is not limited to a state or status of a device or process, a reading or measurement from a device such as a sensor, information collected or generated by an application or process, etc, as well as presence information. Additionally or alternatively, information indicated by the presence attributes can include other types of information. For example, information indicated by one or more presence attributes can include but is not limited to a multimedia document, a Uniform Resource Identifier (URI) to a document of stream, etc.

As described in detail in the Related Application, a presence attribute can be defined for any type of information of a device, system, agent, or other entity to be monitored that can then be used, i.e., published/subscribed. That is, presence information can be obtained by the SDP 402 and/or services 408-422 using a subscribe/publish model wherein a vehicle 426 or agent publishes presence attributes to the SDP 402 which in turn notifies authorized subscribers, e.g., services 408-422, of the information or change of information. Thus, when the telematic information of the vehicle changes or another event occurs, the presence attributes in the presence profile of that vehicle can be updated and the update can be published to one or more services 408-422. Additionally or alternatively, presence information can be obtained by the services 408-422 by interrogating or querying the repository 432 which in turn responds to the query.

Data collected by sensors of the vehicle 426 or network can be provided as presence attributes associated with the vehicle, exploiting the extensibility of the presence data model. Interested parties (e.g., diagnostic and monitoring or other services) can subscribe to the information. According to one embodiment, the edge server 428 can be set up as a presence network agent. Notification in such case can be immediate. Doing so can avoid a need to use requiring specific protocol adapters and provides immediate notification. In such cases, event filtering, interpretation, etc. may be done in the vehicle. When the processing is left to the server, notifications can be generated via the messaging enabler integrated with BPEL.

Location can be determined by the vehicle (e.g. via GPS) and/or in the network and published, for example by the presence network agent of the edge server 428, to the SDP 402 where the vehicle 426 can collect it. This method is especially useful when GPS is not available (e.g. out of the line of sight of satellites). In some implementations, location information for fleet management can be published as presence attributes associated to the individual vehicles of the fleet. As a result, client and server based applications can rely on a presence based programming model to access and exploit presence. The applications may be part of the presence network and/or can rely on the Parlay X presence interface exposed by the presence enabler as northbound enabler interface as described in the Related Applications. For example, a navigation application can be built using the location information.

Additionally or alternatively and as noted above, the SDP 402 can be adapted to provide one or more multimedia services to the vehicle 426 over the communication network as described, for example, in the Related Application entitled "Pragmatic Approaches to IMS." For example, the SDP 426, through the various services 408-422, can provide one or more telco functions to the vehicle 426. For example, the one or more telco functions can comprise voice services, a charging function, a Quality of Service (QoS) management and enforcement function, a presence service, etc. The SDP 402 can be further adapted to provide one or more services with features as provided by IP Multimedia Subsystem (IMS). For example, such services can comprise a streaming media service, an IP television service, a multimedia messaging service, an instant messaging service, a telephony service, a presence service, a push-to-talk service, a voice and/or multimedia conference service, a download service, an upload service, etc. Interaction with assistance operators, authorized parties and BOTs can be provided via a multimedia messaging client that can support, for example presence, buddy lists, IM, VoIP chat, Video chat, IM to SMS in/out and other messaging channels. The client can also be integrated with a virtual PBX that allows the drive to set hunting groups and manage queues of incoming calls (send to other numbers or users, send to voicemail, put on hold etc).

Stated another way, a system 400 for providing in-vehicle communication services, can comprise a communications network such as one or more cellular or other mobile networks. A user agent for the vehicle 426 can be communicatively coupled with the communications network. The user agent can publish one or more presence attributes for the vehicle 426. For example, the one or more published presence attributes can comprise one or more attributes indicating a vehicle location and/or one or more attributes indicating vehicle telemetrics.

An SDP 402 can be communicatively coupled with the communications network. The SDP 402 can provide a presence service adapted to receive the one or more published presence attributes from the user agent of the vehicle 426 and update a presence profile, e.g., maintained in repository 432, for the vehicle 426 based on the received presence attributes. As noted, the presence attributes can comprise at least one attribute indicating information other than presence information, e.g., various system information and other telematics.

The SDP 426, through the various services 408-422, can be further adapted to provide one or more telco functions to the vehicle. For example, the one or more telco functions can comprise a charging function, a Quality of Service (QoS) management and enforcement function, a presence service, etc. The SDP 402 can be further adapted to provide one or more services with features as provided by IP Multimedia Subsystem (IMS). For example, such services can comprise a streaming media service, an IP television service, a multimedia messaging service, an instant messaging service, a telephony service, a presence service, a push-to-talk service, a voice and/or multimedia conference service, a download service, an upload service, etc.

Thus, in use, the SDP 405 with SOA 404 can be used to exploit many of conventional tools and capabilities provide with IT platforms. For example, using Business activity Monitoring (BAM) as part of the SOA 404, an administrator or the driver of the vehicle 426 can be presented (in real time or in a differed mode), diagnostic information collected from the vehicle 426. Business intelligence tools can then be applied to study the data and possibly issue warnings, initiate campaigns or manage a fleet.

As is typical with most mobile communication networks, drops in the coverage or poor communications may occur, especially as the vehicle moves. According to the pragmatic IMS described in the Related Application entitled "Pragmatic Approaches to IMS," the SDP 402 and telco functions can be adapted to provide continuity as will be described below with reference to FIG. 5. In some cases, service continuity can include switching or changing between available networks. For example, a session started over a WLAN may be continues over a cellular network. In another cases, a session on a network may be put on hold and resumed when coverage is available.

Figure 5:
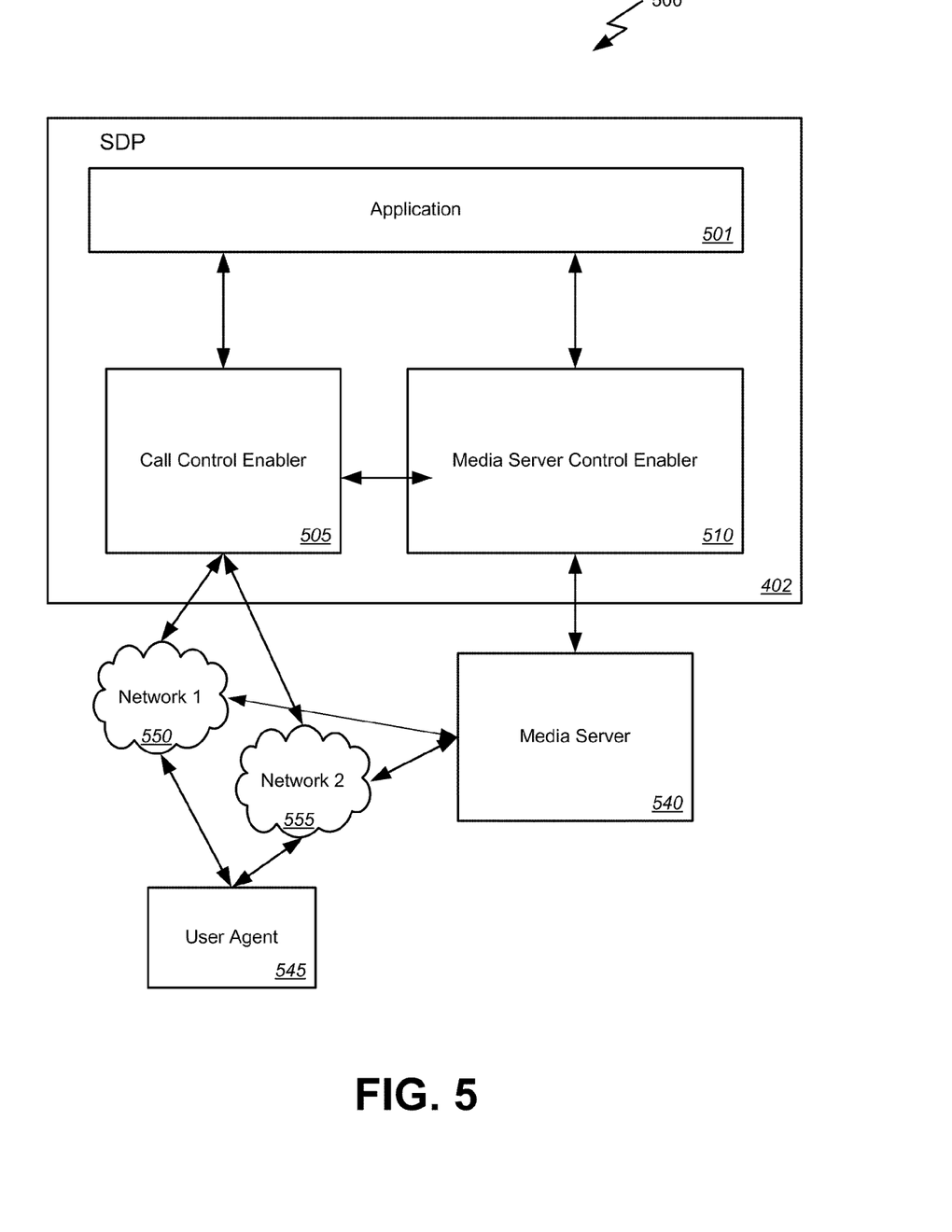
FIG. 5 is a block diagram illustrating components for providing third party call control and call continuity according to one embodiment of the present invention.

FIG. 5 is a block diagram illustrating components for providing third party call control and call continuity according to one embodiment of the present invention. As illustrated here, the system 500 includes an application 501 which may be executed, for example, on the SDP 402 as described above to provide one or more telco functions. The system 500 can also include a user agent 545 such as a client application in the vehicle that can be communicatively coupled with the application 501 via a first communications network 550 such as a cellular or other wireless network. The user agent 545 can be adapted to participate in a communication session over the first communications network 550. The session can include or be directed by the application 501 via a call control enabler 505 as described in the Related Application entitled "Call Control Enabler Abstracted from Underlying Network Technologies" and/or a media server control enabler and media server 540 as described the Related Application entitled "Network Agnostic Media Control Enabler."

According to one embodiment, the application 501 and/or SDP 402 can be adapted to support call continuity with the user agent 545. In some cases, service continuity can include switching or changing between available networks. For example, a session started over the first network 550 may be continued over a second network 555 if available. In another cases, for example if the second network 555 is unavailable, the session on the first network 550 may be put on hold and resumed when coverage is again available.

For example, such continuity can be achieved according to the methods and systems described in the Related Applications entitled "In-Session Continuation via Data Server" and "Service Level Quality of Service (QoS) Policy Enforcement." As described therein, a call or media interaction on the first network 550, using the call control enabler 505, can be put in a conference call with a media server 540 controlled via the media server enabler 510. When the connection on the first network 550 is dropped, the rest of the interaction can be paused in the media server 540 and other calls can remain active. Clients can try to reconnect when the first network 550 is again available or established on the second network 555. In other cases, the media server 540 may try to do the same (e.g. when it detects the clients' presence). In either case, the session can then be resumed. If others parties to the session that is placed on hold are other users, messages played by the media server 540 can ask the parties to wait for the user to come into new coverage zone and, based on location, may even estimate how long it will take (i.e., how long to reach a decent coverage area). Such an infrastructure plus media server is an example of Telco functions that can be added as desired according to the methods and systems of the Related Application entitled "Pragmatic Approaches to IMS."

Stated another way, the SDP 402 can be adapted to maintain a communication session with the vehicle user agent 545 upon a failure of the session on the first communication network 550. A media server 540 can be adapted to maintain a state of the communication session. The communication session can be resumed with the vehicle user agent 545 on the first communication network 550 if or when it becomes available again or can be resumed on the second communication network 555 if or when it becomes available.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for providing in-vehicle communication services, the system comprising:
   a first communications network;
   a second communications network, wherein the second communications network is different from the first communications network;
   a computing device executing a vehicle user agent communicatively coupled with the first communications network, wherein the vehicle user agent publishes one or more published presence attributes; and
   a server executing a Service Delivery Platform (SDP) communicatively coupled with the communications network, the SDP providing a presence service adapted to receive the one or more published presence attributes from the vehicle user agent, update a presence profile for the vehicle user agent based on the received presence attributes, and provide one or more telco functions to the vehicle user agent, wherein the presence attributes comprise at least one attribute indicating information other than presence information, wherein the SDP further comprises a media server, wherein the SDP is adapted to maintain a communication session with the vehicle user agent upon a failure of the session on the first communication network, and wherein maintain the communication session comprises maintaining a state of the communication session with the media server and resuming the communication session with the vehicle user agent on the second communication network.

2. The system of claim 1, wherein the one or more published presence attributes comprise at least one attribute indicating a vehicle location.

3. The system of claim 1, wherein the one or more published presence attributes comprise at least one attribute indicating vehicle telemetrics.

4. The system of claim 1, wherein the one or more telco functions comprise a charging function.

5. The system of claim 1, wherein the one or more telco functions comprise a Quality of Service (QoS) management and enforcement function.

6. The system of claim 1, wherein the one or more telco functions comprise a presence service.

7. The system of claim 1, wherein the SDP is further adapted to provide one or more services with features as provided by IP Multimedia Subsystem (IMS).

8. The system of claim 7, wherein the one or more services comprise a streaming media service.

9. The system of claim 7, wherein the one or more services comprise a an IP television service.

10. The system of claim 7, wherein the one or more services comprise a multimedia messaging service.

11. The system of claim 7, wherein the one or more services comprise an instant messaging service.

12. The system of claim 7, wherein the one or more services comprise a telephony service.

13. The system of claim 7, wherein the one or more services comprise a presence service.

14. The system of claim 7, wherein the one or more services comprise a push-to-talk service.

15. The system of claim 7, wherein the one or more services comprise a conference service.

16. The system of claim 15, wherein the conference service comprises a voice conference service.

17. The system of claim 15, wherein the conference service comprises a multimedia conference service.

18. The system of claim 7, wherein the one or more services comprise a download service.

19. The system of claim 7, wherein the one or more services comprise an upload service.

20. The system of claim 1, wherein the first communications network comprises an IMS network and the second communications network comprises a non-IMS network.

21. A method for providing in-vehicle communication services, the method comprising:
receiving at a Service Delivery Platform (SDP) one or more published presence attributes from a vehicle user agent via a first communications network;
updating by the SDP a presence profile for the vehicle user agent with a presence service based on the received presence attributes, wherein the presence attributes comprise at least one attribute indicating information other than presence information;
providing by the SDP one or more telco functions to the vehicle user agent via a communication session on the first communications network;
maintain by the SDP a state the communication session with the vehicle user agent upon a failure of the session on the first communication network; and
resuming by the SDP the communication session with the vehicle user agent on a second communication network, wherein the first communications network is different from the second communications network.

22. The method of claim 21, wherein the one or more published presence attributes comprise one or more of an attribute indicating a vehicle location and an attribute indicating vehicle telemetrics.

23. The method of claim 21, wherein the one or more telco functions are selected from a group consisting of: a charging function; a Quality of Service (QoS) management and enforcement function; and a presence service.

24. The method of claim 21, wherein the presence service is provided by the SDP.

25. The method of claim 24, further comprising providing with the SDP one or more services with features as provided by IP Multimedia Subsystem (IMS).

26. The method of claim 25, wherein the one or more services are selected from a group consisting of: a streaming media service; an IP television service; a multimedia messaging service; an instant messaging service; a telephony service; a presence service; a push-to-talk service; a conference service; a voice conference service; a download service; and an upload service.

27. A machine-readable memory having stored thereon a series of executable instructions which, when executed by a processor, cause the processor to provide in-vehicle communication services by:
receiving one or more published presence attributes from a vehicle user agent at a presence service of a Service Delivery Platform (SDP) via a first communications network, wherein the one or more published presence attributes comprise one or more of an attribute indicating a vehicle location and an attribute indicating vehicle telemetrics;
updating a presence profile for the vehicle user agent with the presence service based on the received presence attributes, wherein the presence attributes comprise at least one attribute indicating information other than presence information and to provide one or more telco functions to the vehicle user agent, wherein the one or more telco functions are selected from a group consisting of: a charging function; a Quality of Service (QoS) management and enforcement function; and a presence service;
providing with the SDP to the vehicle user agent via a communication session on the first communications network one or more services with features as provided by IP Multimedia Subsystem (IMS), wherein the one or more services are selected from a group consisting of: a streaming media service; an IP television service; a multimedia messaging service; an instant messaging service; a telephony service; a presence service; a push-to-talk service; a conference service; a voice conference service; a download service; and an upload service;
maintain by the SDP a state the communication session with the vehicle user agent upon a failure of the session on the first communication network; and
resuming by the SDP the communication session with the vehicle user agent on a second communication network, wherein the first communications network is different from the second communications network.

* * * * *

UNITED STATES PATENT AND TRADEMARK OFFICE
CERTIFICATE OF CORRECTION

| | | |
|---|---|---|
| PATENT NO. | : 8,090,848 B2 | Page 1 of 1 |
| APPLICATION NO. | : 12/544459 | |
| DATED | : January 3, 2012 | |
| INVENTOR(S) | : Maes | |

It is certified that error appears in the above-identified patent and that said Letters Patent is hereby corrected as shown below:

In column 4, line 42, delete "machine readable" and insert -- machine-readable --, therefor.

In column 11, line 5, delete "on" and insert -- one --, therefor.

In column 14, line 38, delete "machine readable" and insert -- machine-readable --, therefor.

In column 15, line 31, in Claim 9, delete "a an" and insert -- an --, therefor.

Signed and Sealed this
Twenty-seventh Day of March, 2012

David J. Kappos
*Director of the United States Patent and Trademark Office*